United States Patent
Li et al.

(10) Patent No.: US 12,553,895 B2
(45) Date of Patent: Feb. 17, 2026

(54) FUSION ANTIGEN OF PORCINE GETAH VIRUS, KIT, PREPARATION METHOD THEREFOR AND APPLICATION THEREOF

(71) Applicant: Yangzhou University, Jiangsu (CN)

(72) Inventors: Yanhua Li, Jiangsu (CN); Chenxi Li, Jiangsu (CN); Linjie Zhang, Jiangsu (CN)

(73) Assignee: Yangzhou University, Yangzhou (CN)

( * ) Notice: Subject to any disclaimer, the term of this patent is extended or adjusted under 35 U.S.C. 154(b) by 0 days.

(21) Appl. No.: 19/246,586

(22) Filed: Jun. 23, 2025

(65) Prior Publication Data
US 2026/0023077 A1    Jan. 22, 2026

(30) Foreign Application Priority Data
Jul. 18, 2024 (CN) .......................... 202410964977.9

(51) Int. Cl.
| | |
|---|---|
| *G01N 33/569* | (2006.01) |
| *C07K 14/005* | (2006.01) |
| *C12N 5/071* | (2010.01) |
| *C12N 9/02* | (2006.01) |
| *C12N 15/62* | (2006.01) |
| *C12N 15/85* | (2006.01) |
| *C12N 15/88* | (2006.01) |

(52) U.S. Cl.
CPC ..... *G01N 33/56983* (2013.01); *C07K 14/005* (2013.01); *C12N 5/0686* (2013.01); *C12N 9/0069* (2013.01); *C12N 15/62* (2013.01); *C12N 15/85* (2013.01); *C12N 15/88* (2013.01); *C07K 2319/61* (2013.01); *C12N 2770/36122* (2013.01); *C12Y 113/12* (2013.01); *G01N 2333/181* (2013.01)

(58) Field of Classification Search
CPC ....... G01N 33/56983; G01N 2333/181; C07K 14/005; C07K 2319/61; C12N 5/0686; C12N 9/0069; C12N 15/62; C12N 15/85; C12N 15/88; C12N 2770/36122; C12Y 113/12
See application file for complete search history.

(56) References Cited

U.S. PATENT DOCUMENTS

2010/0136047 A1 * 6/2010 Fang ................... C07K 14/005
                                                             435/235.1

FOREIGN PATENT DOCUMENTS

| CN | 116063563 A |   | 5/2023 | |
|---|---|---|---|---|
| CN | 116953230 A | * | 10/2023 | ........ G01N 33/56983 |

OTHER PUBLICATIONS

Gu et al. 2023. CN 116953230 A. Machine translation. (Year: 2023).*
Structural polyprotein [Getah virus]; GenBank: UJU86088.1; Genkank; Nov. 10, 2022.

* cited by examiner

*Primary Examiner* — Janet L Andres
*Assistant Examiner* — Carey Alexander Stuart

(57) ABSTRACT

Provided are a fusion antigen of porcine Getah virus (GETV), a kit, a preparation method therefor and an application thereof. The fusion antigen of the GETV is primarily prepared by recombining a Gaussia luciferase (GLuc) gene with a codon-optimized GETV E2 antigen gene to construct an expression vector, and transfecting the expression vector containing GLuc-E2 into mammalian cell lines, resulting in the secretion of GLuc-E2 proteins into a cell supernatant for expression. Without the need for protein purification step, the cell supernatant may be directly collected for disease detection. The present disclosure demonstrates strong specificity and shows no cross-reactivity with African swine fever virus (ASFV), porcine reproductive and respiratory syndrome virus (PRRSV), porcine circovirus type 2 (PCV2), pseudorabies virus (PRV), or Japanese encephalitis virus (JEV).

7 Claims, 7 Drawing Sheets
Specification includes a Sequence Listing.

FUSION ANTIGEN OF PORCINE GETAH VIRUS, KIT, PREPARATION METHOD THEREFOR AND APPLICATION THEREOF

CROSS-REFERENCE TO RELATED APPLICATION

This application claims priority of Chinese Patent Application No. 202410964977.9, filed on Jul. 18, 2024, the entire contents of which are incorporated herein by reference.

REFERENCE TO A SEQUENCE LISTING SUBMITTED VIA EFS-WEB

The content of the xml file of the sequence listing named "HKIP-US-1-1581-64-SEQUENCE LISTING" which is 6,430 b in size was created on Jun. 16, 2025 and electronically submitted via EFS_Web herewith. These sequence listing is incorporated herein by reference in its entirety.

TECHNICAL FIELD

The present disclosure belongs to the technical field of virus detection, and specifically relates to a fusion antigen of porcine Getah virus (GETV), a kit, a preparation method therefor and an application thereof.

BACKGROUND

GETV is a single-stranded positive-sense ribonucleic acid (RNA) virus belonging to the genus *Alphavirus* within the family Togaviridae. GETV is transmitted to vertebrates through mosquito bites, primarily infecting pigs and horses. In swine, it can cause reproductive failure in sows, leading to abortions, stillbirths, or weak piglets. Infected horses may exhibit symptoms including fever, skin rashes, hind limb edema, and lymphadenopathy. In addition, neutralizing antibodies against GETV have been detected in human serum, with significantly higher specific antibody titers observed in febrile individuals compared to subclinical cases, suggesting that GETV is a potential zoonotic virus.

Porcine GETV disease is most prevalent during the summer and autumn seasons when mosquito activity peaks. Clinical manifestations of GETV infection in swine, such as reproductive disorders, neonatal diarrhea, and respiratory distress, closely resemble those of porcine epidemic diarrhea or porcine reproductive and respiratory syndrome, leading to this disease often being misdiagnosed as other porcine reproductive or diarrheal disorders, thereby resulting in delayed diagnosis and inadequate prevention. Therefore, establishing rapid and accurate diagnostic methods is of great significance for the prevention and control of porcine GETV disease. Currently, the available commercial detection kits for porcine GETV are exclusively nucleic acid detection kits employing a fluorescent reverse transcription-polymerase chain reaction (RT-PCR) dye method. However, the RT-PCR method several drawbacks, including cumbersome operational procedures, stringent requirements for specialized laboratory equipment, and susceptibility to cross-contamination risks. Additionally, the laboratory has successively established serological detection methods for porcine GETV, such as indirect enzyme-linked immunosorbent assay (ELISA) and double antibody sandwich ELISA. However, the specificity and accuracy of ELISA methods primarily depend on the quality of the prepared GETV antigen and antibodies. Furthermore, the ELISA methods have stringent requirements for enzyme activity and sensitivity. If the reaction concentration of antigen or antibody with enzyme-conjugated substrate is insufficient, it may result in an excessively low final absorbance value, increasing the likelihood of false-negative outcomes. Therefore, at present, there is a lack of highly sensitive clinical detection methods for GETV.

SUMMARY

In response to the technical problems to be solved, the present disclosure provides a fusion antigen of porcine GETV, a kit, and a preparation method therefor and an application thereof to overcome the deficiencies in the related art. A luciferase immunoprecipitation system (LIPS) can be utilized for porcine GETV infection detection based on luminescence intensity, offering rapid operation, high sensitivity, superior signal-to-noise (S/N) ratio, and stable and reliable measurement.

To realize the above objective, the present disclosure employs the following technical solutions.

In one technical solution: the present disclosure provides a fusion antigen of porcine GETV, in which the fusion antigen is a Gaussia luciferase (GLuc)-E2 fusion protein, and the GLuc-E2 fusion protein has an amino acid sequence as shown in SEQ ID NO.2.

The fusion antigen of the GETV is primarily prepared by recombining a GLuc gene with a codon-optimized GETV E2 antigen gene to construct an expression vector, and transfecting the expression vector containing GLuc-E2 into mammalian cell lines, resulting in the secretion of GLuc-E2 proteins into a cell supernatant for expression. Without the need for protein purification step, the cell supernatant may be directly collected for disease detection.

Preferably, the mammalian cell lines are human embryonic kidney (HEK)-293T cells.

The present disclosure further provides a method for preparing the fusion antigen of GETV, including the steps of:

S1, performing codon optimization and synthesizing a nucleotide sequence based on a whole genome sequence of E2 proteins from GETV strains, and ligating the sequence-optimized E2 genes into a eukaryotic expression vector pCAGGS (+) plasmid to obtain a recombinant plasmid pCAGGS-E2;

S2, taking the plasmid pCAGGS-E2 as a template, amplifying an E2 fragment using a forward primer (F): AAGGGGAGTGGCGA-TATCTCTGTGACAGAGCACTTTA as set forth in SEQ ID NO: 3 and a reverse primer (R): AAAAA-GATCTGCTAGCTCGAGTCAAGGGTA-CAGGCCGTAGT as set forth in SEQ ID NO: 4, performing double digestion on the amplified E2 antigen gene fragment and the pCAGGS-GLuc vector plasmid carrying GLuc genes with EcoRV and XhoI restriction enzymes, and ligating enzyme-digested products using a T4 DNA ligase to obtain a recombinant plasmid pCAGGS-GLuc-E2; and S3, culturing the HEK-293T cells, transfecting the recombinant plasmid pCAGGS-Gluc-E2 into the cells using a Lipofectamine 2000 liposomal nucleic acid transfection reagent if a cell density reaches 60-70%, further culturing the 293T cells after transfection, and collecting and centrifuging a cell supernatant after culture to obtain the GLuc-E2 fusion protein from the collected supernatant.

In another technical solution: the present disclosure provides a luciferase immunoprecipitation kit for detecting porcine GETV, including the following components: sample diluent, blocking buffer, GLuc-E2 fusion protein fluid, protein A-coated microplate, wash buffer, luciferase substrate, positive control, and negative control.

Preferably, the sample diluent is phosphate-buffered saline (PBS) at pH=7.4; the wash buffer is PBS containing 0.05% Tween-20 (PBST); and the luciferase substrate is 20 μM of coelenterazine h.

Preferably, the blocking buffer includes at least one of 1% of bovine serum albumin (BSA), 5% of skim milk, or 10% of skim milk; and the positive control is GETV standard positive serum, and the negative control is GETV standard negative serum.

Preferably, a preparation and preservation method for the protein A-coated microplate includes the steps of: preparing the protein A into a protein A solution with a concentration of 20 μg/mL using the PBS, adding the protein A solution to the microplate at 100 μL/well, sealing the microplate with a film, discarding the protein A solution after incubating at 4° C. for 16 hours, washing the plate 5 times with PBST at 300 μL/well, and drying the microplate at 4° C. for preservation.

In a further technical solution: the present disclosure provides a construction method for the luciferase immunoprecipitation kit for detecting porcine GETV, including the steps of:

S1, preparing a GETV GLuc-E2 fusion protein fluid;

S2, determining a blocking buffer, the blocking buffer including at least one of 1% of BSA, 5% of skim milk, or 10% of skim milk;

S3, blocking: setting a sealing temperature at 37° C. and a sealing time at 1 h;

S4, incubation: setting an incubation temperature at 37° C. and an incubation time at 1 h;

S5, fusion antigen addition: adding fusion antigen at a quantity of 107 luminance units; and S6, diluting a serum sample to be tested, and GETV positive or negative control serum samples at a serum dilution ratio of 1:100.

A method for detecting the above kit includes the steps of:

S1, equilibration: removing the kit from refrigerated storage, and allowing it to equilibrate at room temperature for 15 minutes before use;

S2, blocking: adding 300 μL of blocking buffer to each well of the protein A-coated microplate equilibrated at room temperature, incubating at 37° C. for 1 h, and discarding the liquid; adding 300 μL of wash buffer to each reaction well, allowing to stand for 5 min, and discarding the liquid; repeating this washing cycle for a total of 5 times, and removing residual liquids by blotting the reaction plate after the final wash;

S3, sample dilution: diluting the serum sample to be tested, and positive control or negative control samples 100-fold with sample dilution buffer for subsequent use;

S4, fusion protein dilution: diluting the GLuc-E2 fusion antigen to a concentration of $10^7$ luminance units using the sample dilution buffer;

S5, sample addition: individually mixing the diluted test sample, and positive and negative control serum samples with $10^7$ luminance units of GLuc-E2 fusion antigen, achieving a total volume of 100 μL, and transferring the mixture to the blocked protein A-coated microplate;

S6, reaction: covering a sealing film on the reaction plate, and placing the reaction plate into an incubator at 37° C. for 1 h;

S7, plate washing: spin-drying reaction liquids from all wells, filling each well with diluted wash buffer, allowing to stand for 5 min, and discarding the liquid; and repeating this washing cycle for a total of 5 times, and removing residual liquids by blotting the reaction plate after the final wash;

S8, substrate addition and detection: adding 100 μL of luciferase substrate to each well, detecting luciferase values using a LumiStation-1800 luminescence detector, and recording the values; and S9, result determination: classifying a serum sample as positive if a detection value of the serum sample to be tested divided by an average value of negative controls is ≥41.57.

In a further preferred technical solution: the present disclosure provides an application of the fusion antigen of porcine GETV in the preparation of a product for detecting porcine GETV, in which the product is a reagent or a kit.

The present disclosure has the following beneficial effects.

(1) In the present disclosure, the GLuc-E2 fusion antigen is selected, and secreted into the cell supernatant for expression, demonstrating high expression efficiency, simplified production, low cost, and eliminating the need for tedious steps such as protein purification.

(2) The present disclosure demonstrates strong specificity and shows no cross-reactivity with African swine fever virus (ASFV), porcine reproductive and respiratory syndrome virus (PRRSV), porcine circovirus type 2 (PCV2), pseudorabies virus (PRV), or Japanese encephalitis virus (JEV).

(3) The positive and negative serum samples of porcine GETV detected had a 100% coincidence rate with the results of immunofluorescence detection, with a high accuracy rate.

(4) The present disclosure has the advantage of rapid and simple operation, delivering results within 3 h. Operators, not restricted by technical complexity, can perform the procedure by following the manual's instructions.

(5) The present disclosure features high stability, with both intra-batch and inter-batch coefficients of variation maintained below 10%.

BRIEF DESCRIPTION OF THE DRAWINGS

For ease of illustration, the present disclosure is described in detail with reference to the following specific implementations and the accompanying drawings.

DETAILED DESCRIPTION

Hereinafter, the technical solutions of the present disclosure are further described in detail with reference to the embodiments. These embodiments are implemented based on the technical solutions of the present disclosure and provide detailed implementations and specific operation processes, but the scope of the protection of the present disclosure is not limited to the following embodiments.

The materials, practices and experimental equipment involved in the embodiments of the present disclosure, unless otherwise specified, all conform to the commercially available products in the relevant chemical and biotechnology fields.

Embodiment 1 Preparation of Porcine GETV GLuc-E2 Fusion Protein 1.1 Construction of Recombinant Plasmid pCAGGS-GLuc-E2 as a Eukaryotic Expression Vector Referring to a whole genome sequence of E2 proteins from GETV strains (from Gen Bank: MT086508.1, MT269657.1 and MK693225.1), codon optimization was performed to synthesize a nucleotide sequence, as shown in SEQ ID NO: 1. An optimized E2 gene sequence (purchased from GenScript Biotechnology Co., Ltd.) was synthesized, and ligated into a eukaryotic expression vector pCAGGS (+) plasmid to obtain a recombinant plasmid pCAGGS-E2.

The plasmid pCAGGS-E2 was taken as a template, and an E2 fragment was amplified using primers of F: AAGGGGAGTGGCGATATCTCTGTGACAGAGCACTTTA set forth in SEQ ID No: 3 and R: AAAAAGATCTGCTAGCTCGAGTCAAGGGTACAGGCCGTAGT shownset forth in SEQ ID No: 4. Double digestion was performed on the obtained E2 antigen gene fragment and the pCAGGS-GLuc vector plasmid carrying GLuc genes (Constructed and preserved by a laboratory of COLLEGE OF VETERINARY MEDICINE YANGZHOU UNIVERSITY) with EcoRV and XhoI restriction enzymes, and enzyme-digested products were ligated using a T4 DNA ligase to obtain the recombinant plasmid pCAGGS-GLuc-E2.

1.2 Expression and Verification of Recombinant Gluc-E2 Protein

HEK-293T cells (preserved by the laboratory of COLLEGE OF VETERINARY MEDICINE YANGZHOU UNIVERSITY) were cultured in a 10 $cm^2$ of cell culture dish. If a cell density reached 60-70%, the 8 μg of the recombinant plasmid pCAGGS-Gluc-E2 was transfected into the 293T cells using a Lipofectamine 2000 liposomal nucleic acid transfection reagent (purchased from Invitrogen) at a ratio of 1.5 μL: 1 μg, and the cells were cultured in an incubator at 37° C. with 5% of $CO_2$. After culturing for 60 h, a cell supernatant was collected and centrifuged at 4° C. and 12,000 rpm for 15 min to remove cellular debris. The collected supernatant was the GLuc-E2 fusion protein.

The collected cell supernatant was analyzed by Western blot and Luciferase assay to validate the expression of the GLuc-E2 fusion protein.

Figure 1A:
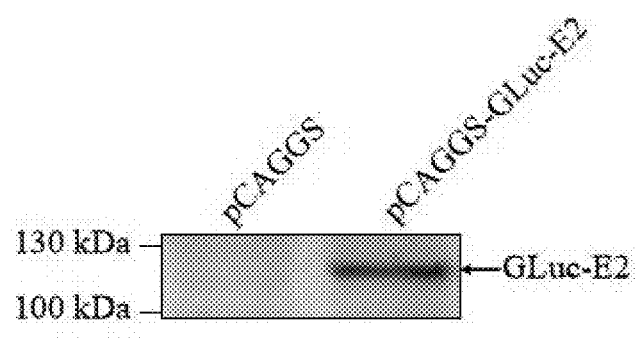
FIG. 1A shows a recombinant GLuc-E2 protein expression validation for Western blot.

The collected cell supernatant was subjected to sodium dodecyl sulfate-polyacrylamide gel electrophoresis (SDS-PAGE) and protein electrotransfer (i.e., membrane transfer). A protein membrane was blocked in PBS buffer containing 5% w/v skim milk at 37°° C. for 2 h, and was incubated overnight at 4° C. using a porcine GETV-positive serum with a serum dilution of 1:1000. After incubation, the protein membrane was washed 3 times with PBST buffer, incubated with horseradish peroxidase (HRP)-labeled goat anti-porcine IgG antibody with a dilution of 1:2000 at room temperature for 1 h, and used for the detection of a chemiluminescence detection kit after washing 3 times with PBST. According to the results, it can be shown that the cell supernatant transfected with pCAGGS-GLuc-E2 contains secreted GLuc-E2, which can be specifically recognized by porcine GETV-positive serum (shown in FIG. 1A).

Figure 1B:
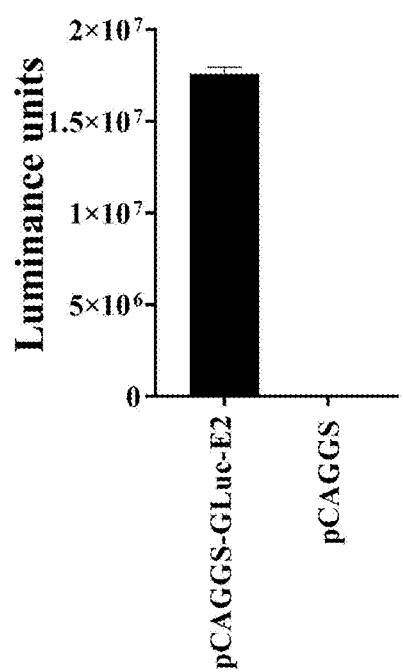
FIG. 1B shows a luciferase activity analysis of the recombinant GLuc-E2 protein in a cell supernatant.
Figure 2A:
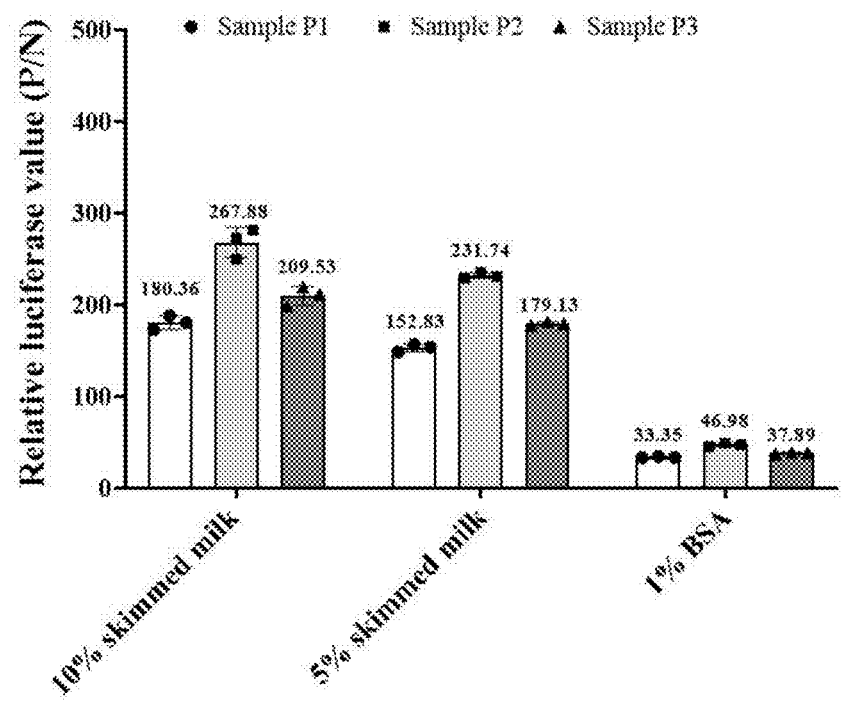
FIG. 2A shows an analytical diagram of reaction conditions under blocking at 25° C. for 30 min and incubation at 37° C. for 1 h.
Figure 2B:
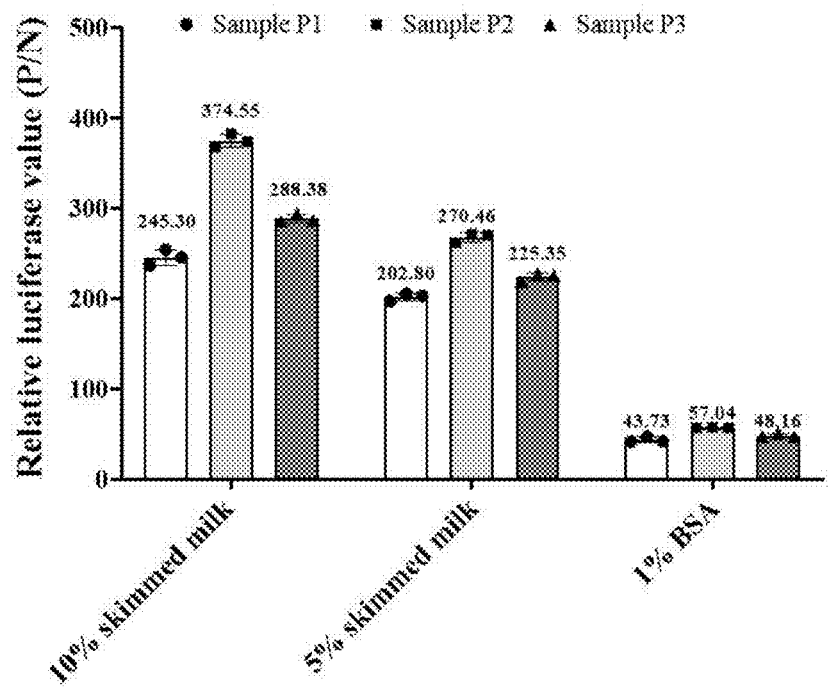
FIG. 2B shows an analytical diagram of reaction conditions under blocking at 25°° C. for 1 h and incubation at 37° C. for 1 h.
Figure 2C:
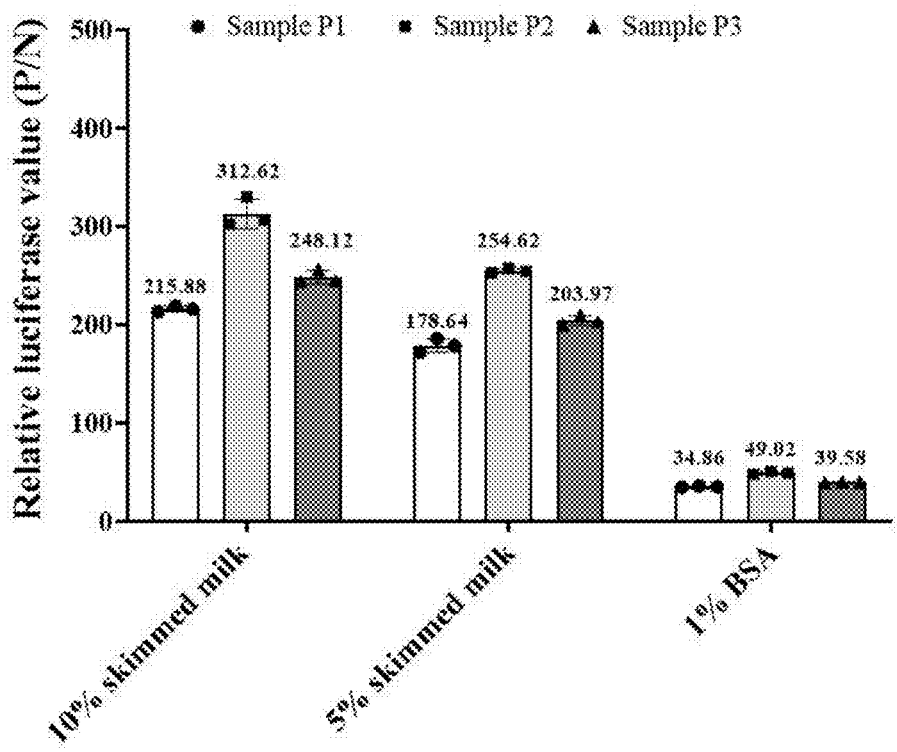
FIG. 2C shows an analytical diagram of reaction conditions under blocking at 37° C. for 30 min and incubation at 37° C. for 1 h.
Figure 2D:
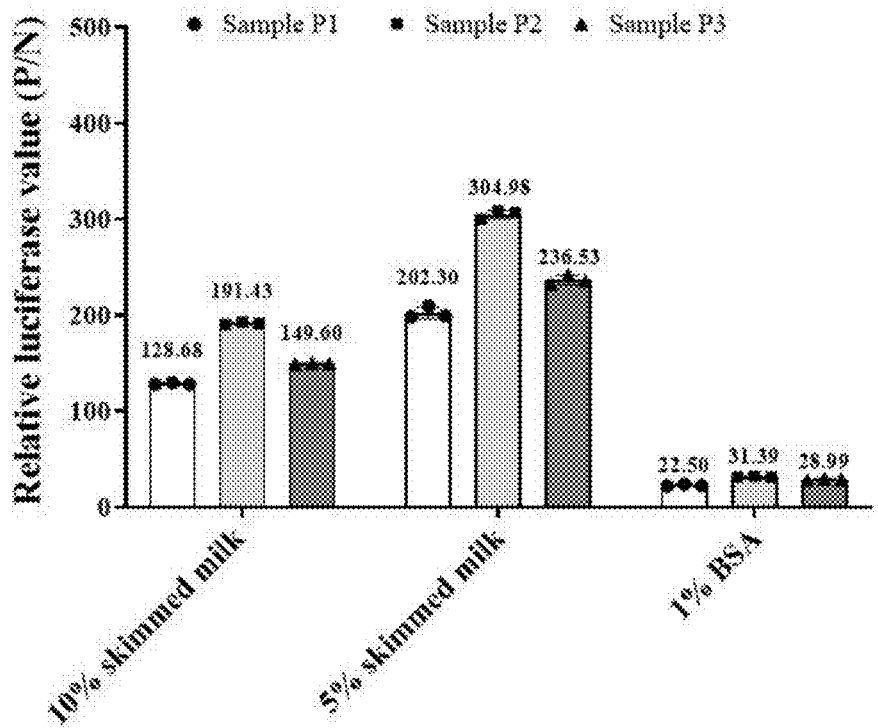
FIG. 2D shows an analytical diagram of reaction conditions under blocking at 37° C. for 1 h and incubation at 25° C. for 30 min.
Figure 2E:
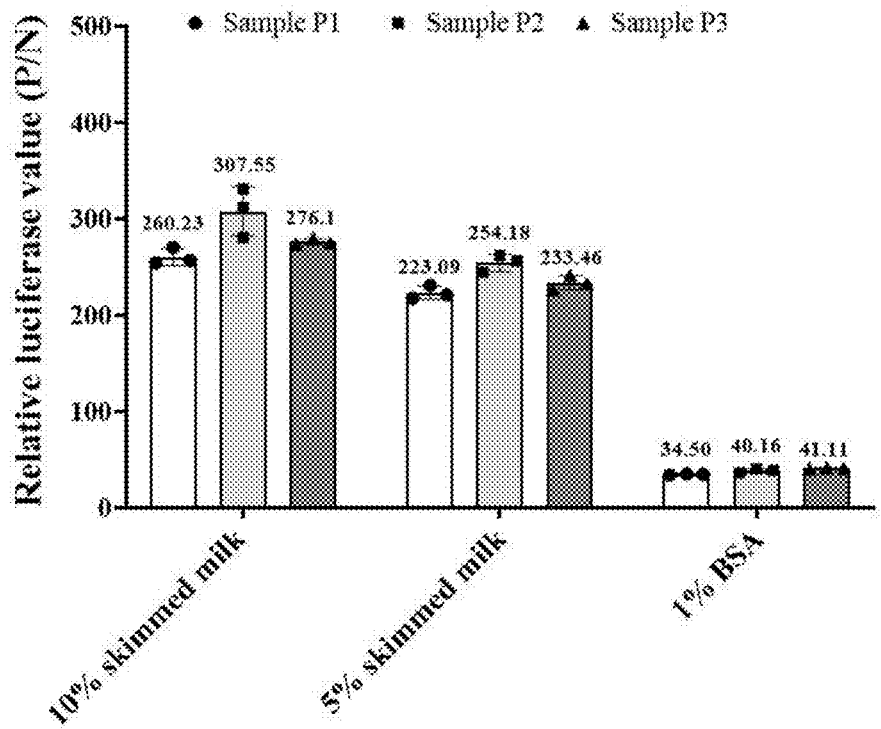
FIG. 2E shows an analytical diagram of reaction conditions under blocking at 37° C. for 1 h and incubation at 25° C. for 1 h.
Figure 2F:
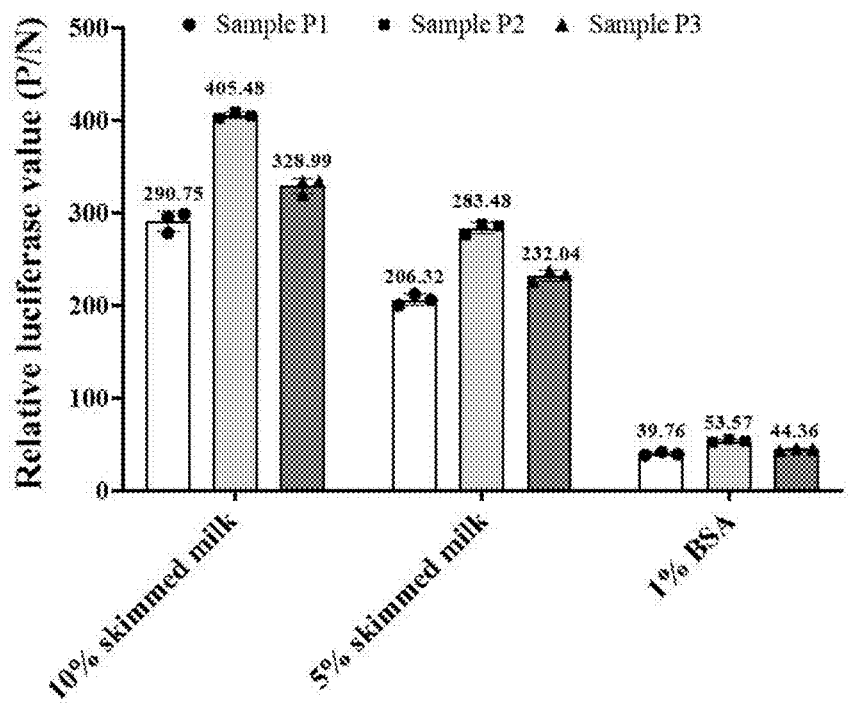
FIG. 2F shows an analytical diagram of reaction conditions under blocking at 37° C. for 1 h and incubation at 37° C. for 1 h.

Moreover, the collected cell supernatant was subjected to GLuc enzymatic activity analysis. 20 μL of the cell supernatant was mixed with 100 μL of GLuc luminescent substrate coelenterazine h (20 μM; and the coelenterazine h was purchased from Shanghai Maokang Biotechnology Co., Ltd.) for reaction, and the GLuc luciferase activity was measured by detecting luciferase values using a LumiStation-1800 luminescence detector. According to the results, it can be shown that the GLuc activity is significantly detectable in the cell supernatant, with luminance units reaching $10^{7.94}$ units/100 μL (as shown in FIG. 1B).

Embodiment 2 Parameter Optimization Experiment of the LIPS for Porcine GETV Detection Based on the Recombinant Gluc-E2 Protein 2.1 Determination of Blocking Buffer, Blocking Temperature, and Blocking Time The protein A was diluted to a concentration of 20 μg/mL using the PBS solution, the PBS solution was added to a microplate at 100 μL/well, and the microplate was sealed with a film and incubated at 4° C. for 16 h. The next day, the solution was discarded, and the plated was washed 5 times with PBST, at 5 min per wash. Three blocking buffers prepared in PBS were tested: 5% of skim milk, 10% of skim milk, and 1% of BSA, with incubation temperatures set at 25° C. and 37° C., and blocking time of 30 min and 60 min. After completing the above conditions, the blocking buffer was discarded, and the plate was washed 5 times with PBST, 5 min per wash. Standard GETV-positive or GETV-negative swine serum samples along with GLuc-E2 fusion protein with $10^7$ fluorescence units were added to each sample well, achieving a total volume of 100 μL, followed by incubation at 37° C. for 1 h. Reaction liquids from all wells were spin-dried, each well was filled with diluted wash buffer of PBST, allowing to stand for 5 min, and the wash buffer was discarded. This washing cycle was repeated for a total of 5 times, and residual liquids were removed by blotting the reaction plate after the final wash.

50 µL of luciferase substrate was added to each well, the luciferase values are detected using the LumiStation-1800 luminescence detector, and recorded.

According to the results, positive/negative (P/N) ratios are calculated under each condition. As demonstrated in FIG. 2, 10% of skim milk exhibits the highest blocking efficiency among the three blocking buffers. As shown in FIG. 2, after blocking with 10% of skim milk at 37° C. for 1 h, the P1/N, P2/N, and P3/N ratios are 290.75, 405.48, and 328.99, demonstrating superior performance compared to other conditions.

2.2 Determination of Reaction Temperature and Time

The microplate was coated with protein A following the steps described in 2.1, and blocked with 10% of skim milk at 37° C. for 1 h. According to the steps described in 2.1, GLuc-E2fusion protein with $10^7$ luminance units was added, along with GETV-positive and negative serums, followed by incubation at 25° C. for 30 min or 37° C. for 1 h. The reaction liquids from all wells were spin-dried, each well was filled with diluted wash buffer of PBST, allowing to stand for 5 min, and the wash buffer was discarded. This washing cycle was repeated for a total of 5 times, and the residual liquids were removed by blotting the reaction plate after the final wash. 50 µL of luciferase substrate was added to each well, the luciferase values are detected using the LumiStation-1800 luminescence detector, and recorded.

According to the results, the P/N ratios are calculated under each condition. As demonstrated in FIG. 2, incubation at 37° C. for 1 h demonstrates optimal performance under all reaction conditions, with P1/N, P2/N, and P3/N values of 290.75, 405.48, and 328.99, demonstrating superior performance compared to other conditions.

2.3 Determination of Optimal Antigen Concentration and Serum Dilution Factor

The microplate was coated with protein A following the steps described in 2.1, and blocked with 10% of skim milk at 37° C. for 1 h. The optimal antigen concentration and serum dilution factor were determined using a limiting serum dilution method. GETV-positive porcine serum was subjected to two-fold serial dilutions (starting at 1:50), extending up to 1:102,400. Furthermore, the GETV-positive porcine serum samples of various dilution factors were mixed with GLuc-E2 fusion protein at $10^5$, $10^6$, or $10^7$ luminance units, and the mixtures were added to the microplate well, followed by incubation at 37° C. for 1 h. The reaction liquids from all wells were spin-dried, each well was filled with diluted wash buffer of PBST, allowing to stand for 5 min, and the wash buffer was discarded. This washing cycle was repeated for a total of 5 times, and the residual liquids were removed by blotting the reaction plate after the final wash. 100 µL of luciferase substrate was added to each well, the luciferase values are detected using the LumiStation-1800 luminescence detector, and recorded.

Figure 3A:
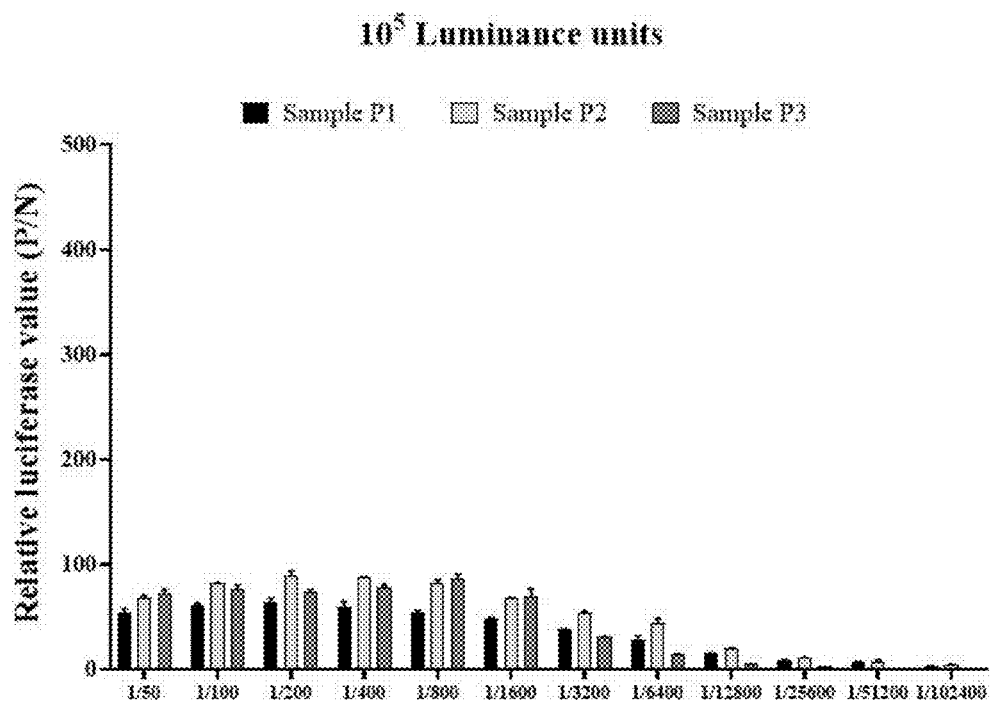
FIG. 3A shows an analytical diagram of reaction results between GLuc-E2 with $10^5$ luciferase units and serially diluted serum.
Figure 3B:
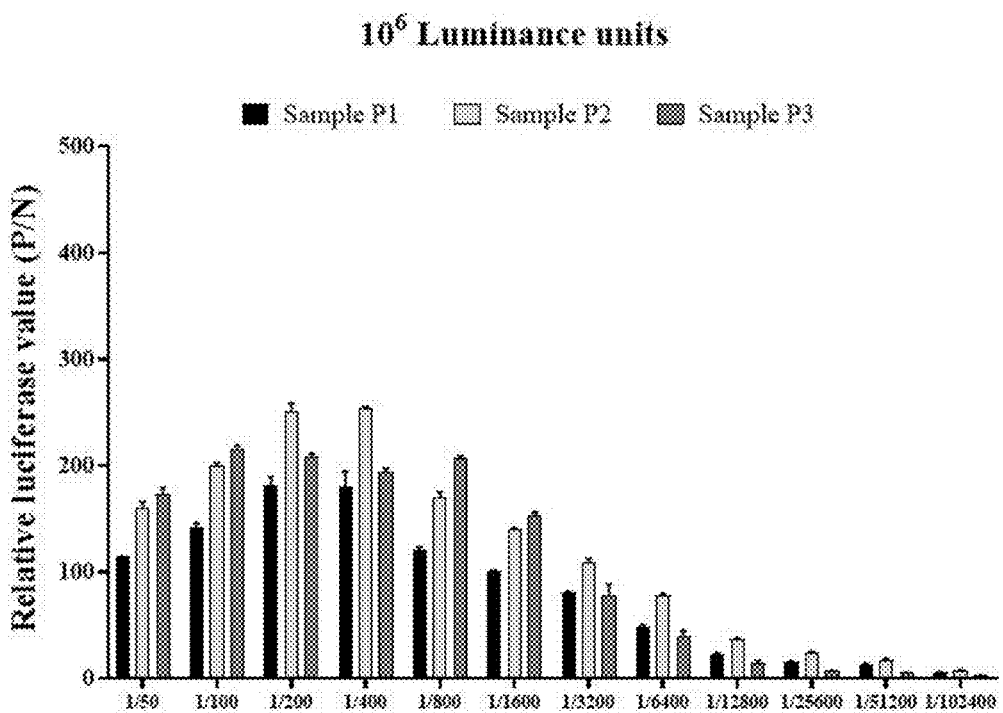
FIG. 3B shows an analytical diagram of reaction results between GLuc-E2 with $10^6$ luciferase units and serially diluted serum.
Figure 3C:
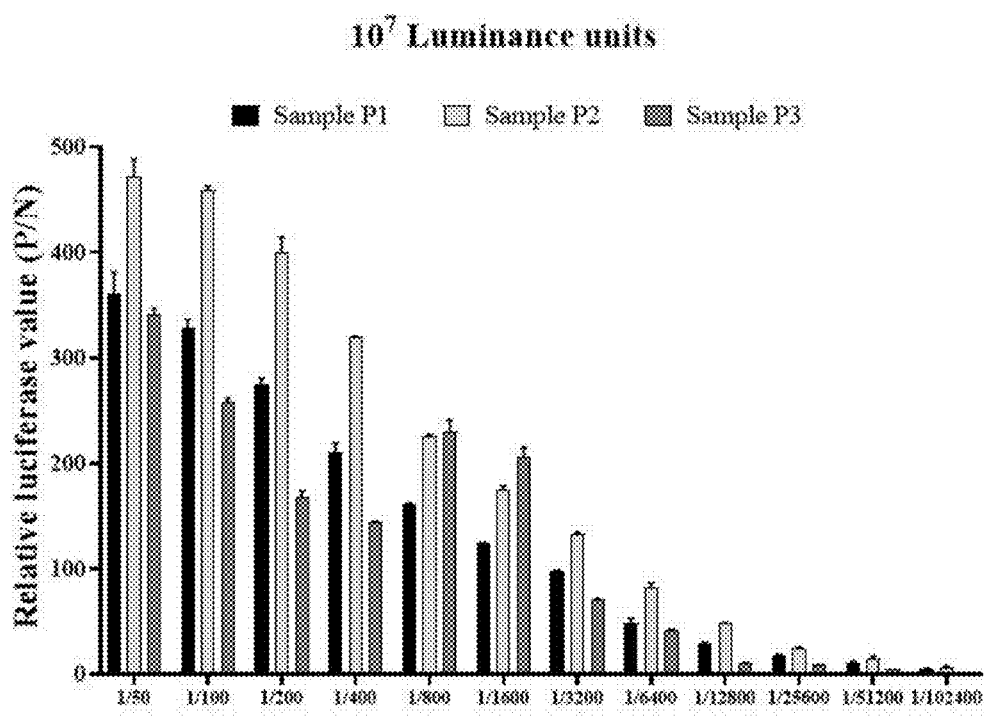
FIG. 3C shows an analytical diagram of reaction results between GLuc-E2 with $10^7$ luciferase units and serially diluted serum.

According to the results, the P/N ratios are calculated under each condition. As demonstrated in FIG. 3, the optimal reaction conditions are achieved with an antigen concentration of $10^7$ luminance units and a serum dilution of 1:100. The mean P1/N, P2/N, and P3/N ratios are 329.22, 459.03, and 257.82, demonstrating superior performance compared to other conditions.

Figure 4A:
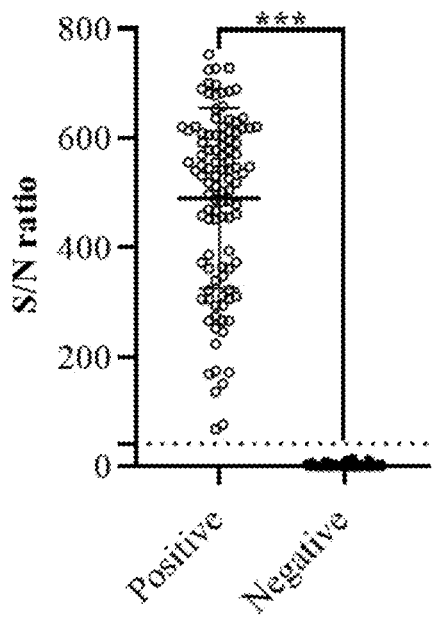
FIG. 4A shows an determination of positive and negative cutoff value for a LIPS method in detecting porcine GETV.
Figure 4B:
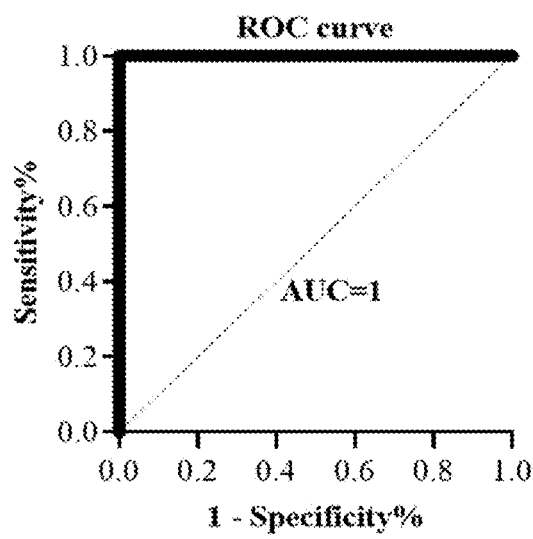
FIG. 4B shows a receiver operating characteristic (ROC) curve analysis diagram for determinating the specificity and sensitivity of the LIPS detection method for porcine GETV.

Embodiment 3 Determination of Positive/Negative Cutoff Value for the LIPS Method in Detecting Porcine GETV Based on the optimal reaction conditions determined in Embodiment 2, a total of 325 GETV-negative serum samples and $10^6$ GETV-positive serum samples were tested under these optimal reaction conditions. Through detection results, ROC curve analysis is performed to obtain a cut-off value of 41.57, with specificity and sensitivity reaching 100%, as demonstrated in FIGS. 4A and 4B.

Embodiment 4 Reproducibility Experiment of the LIPS Detection Method for Porcine GETV Based on the above determined optimal working conditions of the LIPS detection method, intra-assay and inter-assay reproducibility were evaluated. As shown in Table 1 and Table 2, the coefficients of variation (CV) for both intra-and inter-assay analyses of the LIPS for porcine GETV detection were consistently below 10%, demonstrating excellent reproducibility of this assay.

TABLE 1

Inter-assay reproducibility test results

| Inter-assay | P/N ratio | | | | | CV |
|---|---|---|---|---|---|---|
| | Plate 1 | Plate 2 | Plate 3 | Average | STDEV | (%) |
| P1 | 235.31 | 249.24 | 220.63 | 235.06 | 14.31 | 6.09 |
| P2 | 309.99 | 324.26 | 295.05 | 309.77 | 14.61 | 4.72 |
| P3 | 260.21 | 274.24 | 295.44 | 276.63 | 17.74 | 6.41 |

TABLE 2

Inter-assay reproducibility test results

| Inter-assay | P/N ratio | | | | | CV |
|---|---|---|---|---|---|---|
| | Plate 1 | Plate 2 | Plate 3 | Average | STDEV | (%) |
| P1 | 235.31 | 249.24 | 220.63 | 235.06 | 14.31 | 6.09 |
| P2 | 309.99 | 324.26 | 295.05 | 309.77 | 14.61 | 4.72 |
| P3 | 260.21 | 274.24 | 295.44 | 276.63 | 17.74 | 6.41 |

Figure 5:
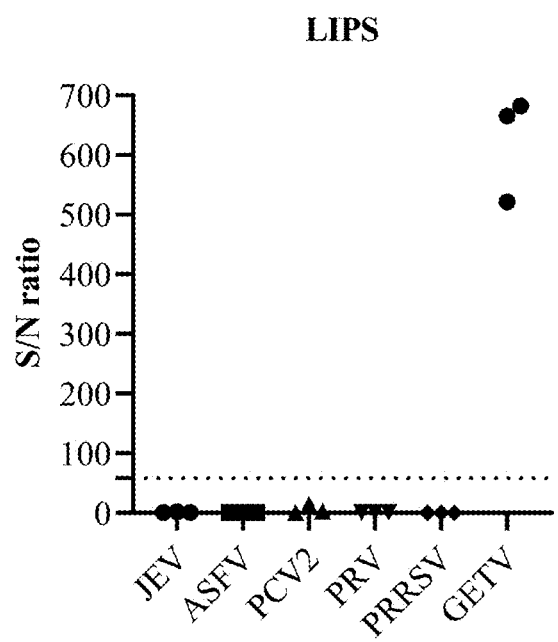
FIG. 5 show a specificity experimental analysis diagram of the LIPS detection method for porcine GETV.

Embodiment 5 Concordance Experiment of the LIPS Detection Method for Porcine GETV An indirect immunofluorescence assay, recognized as the "gold standard" for antibody detection, was utilized to confirm 36 GETV-positive swine serum samples and 10 GETV-negative swine serum samples maintained in the laboratory. These samples were detected using the LIPS detection method for porcine GETV, achieving 100% coincidence between negative and positive samples, and demonstrating that this established LIPS detection method for porcine GETV can be used for clinical detection of GETV antibodies, with certain practical value Embodiment 6 Specificity Experiment of LIPS Detection Method for Porcine GETV Using the established LIPS detection method for porcine GETV, comparative analyses were performed on positive serum samples from ASFV, PRRSV, PRV, PCV2, and JEV. As shown in FIG. 5, it can be seen that the kit in this embodiment of the present disclosure demonstrates excellent specificity with no false-positive results detected.

The foregoing is only the specific embodiment in the present disclosure, but the scope of protection of the present disclosure is not limited thereto. Within the technical scope disclosed by the present disclosure, any person skilled in the art may readily think of changes or substitutions, and these changes or substitutions shall be covered within the scope of the present disclosure. Therefore, the scope of protection of the present disclosure shall be subject to the scope of protection of the claims.

The invention claimed is:
1. A fusion antigen of porcine Getah virus (GETV), being a Gaussia luciferase (GLuc)-E2 fusion protein, wherein the GLuc-E2 fusion protein has an amino acid sequence comprising SEQ ID NO: 2.
2. A method for preparing the fusion antigen of GETV according to claim 1, comprising the steps of:
S1, performing codon optimization and synthesizing a nucleotide sequence based on a whole genome sequence of E2 genes from GETV strains, and ligating the sequence-optimized E2 genes into a eukaryotic expression vector pCAGGS (+) plasmid to obtain a recombinant plasmid pCAGGS-E2;

SEQUENCE LISTING

```
Sequence total quantity: 4
SEQ ID NO: 1            moltype = DNA   length = 1089
FEATURE                 Location/Qualifiers
source                  1..1089
                        mol_type = other DNA
                        organism = synthetic construct
SEQUENCE: 1
tctgtgacag agcactttaa cgtgtacaag gccacaaagc cctacctggc ctactgtgcc    60
gattgcggcg acggccagtt ctgctacagc cctgtggcta tcgagaaaat tcgggacgaa   120
gcttctgatg gaatgatcaa gatccagatc gctgctcaaa tcggaattaa caaaggcgga   180
acccacgagc acaacaagat ccgctacatc gccggacacg atatgaagga agccaacaga   240
gatagcctgc aggtgcacac gtccggcgtg tgcgccatcc ggggcaccat gggccacttc   300
atcgtggcct attgtcctcc tggagacgag ctgaaggtgc aatttcagga cgccgagagc   360
cacacccagg cctgcaaggt gcagtataag cacgccccag ccctgtcgg cagagagag    420
ttcacagtgc ggcctcactt cggcatcgag gtgccttgta ccacatacca gctgacaaca   480
gcccctacag aggaagagat cgacatgcac acccctccag atatccctga catcaccctg   540
ctgtctcagc agagcggcaa tgtgaagatc accgccggcg gcaagacaat cagatacaac   600
tgcacatgcg gcagcggtca cgtgggcacc acctcctccg acaaaaccat caatagctgc   660
aagatcgccc agtgccacgc cgccgtgacc aaccacgaca gtggcagta caccagcagc   720
ttcgtgccta gggccgacca gctgagcaga aagggcaagg tgcatgtgcc cttccctctg   780
acaaacagca cctgtagagt gccagttgct agaaccctg gcgtgaccta tggcaaaaga   840
gaactgaccg tgaaactgca cccagaccac cccaccctgc tgacctaccg gagcctggga   900
gccgacccca gaccctacga ggaatggatc gacagatacg tggaacggac catcccgtt    960
acagaagatg ggatcgagta cagatgggc aacaacccc ccgtcagact gtgggcccag   1020
ctcaccactg agggcaagcc tcacggctgg cctcatgaaa tcatcctgta ctactacggc   1080
ctgtaccct                                                          1089

SEQ ID NO: 2            moltype = AA    length = 561
FEATURE                 Location/Qualifiers
source                  1..561
                        mol_type = protein
                        organism = synthetic construct
SEQUENCE: 2
MGVKVLFALI CIAVAEAKPT ENNEDFNIVA VASNFATTDL DADRGKLPGK KLPLEVLKEM    60
EANARKAGCT RGCLICLSHI KCTPKMKKFI PGRCHTYEGD KESAQGGIGE AIVDIPEIPG   120
FKDLEPMEQF IAQVDLCVDC TTGCLKGLAN VQCSDLLKKW LPQRCATFAS KIQGQVDKIK   180
GAGGDDYKDD DDKGSGDISV TEHFNVYKAT KPYLAYCADC GDGQFCYSPV AIEKIRDEAS   240
DGMIKIQIAA QIGINKGGTH EHNKIRYIAG HDMKEANRDS LQVHTSGVCA IRGTMGHFIV   300
AYCPPGDELK VQFQDAESHT QACKVQYKHA PAPVGREKFT VRPHFGIEVP CTTYQLTTAP   360
TEEEIDMHTP PDIPDITLLS QQSGNVKITA GGKTIRYNCT CGSGHVGTTS SDKTINSCKI   420
AQCHAAVTNH DKWQYTSSFV PRADQLSRKG KVHVPFPLTN STCRVPVART PGVTYGKREL   480
TVKLHPDHPT LLTYRSLGAD PRPYEEWIDR YVERTIPVTE DGIEYRWGNN PPVRLWAQLT   540
TEGKPHGWPH EIILYYYGLY P                                            561

SEQ ID NO: 3            moltype = DNA   length = 37
FEATURE                 Location/Qualifiers
source                  1..37
                        mol_type = other DNA
                        organism = synthetic construct
SEQUENCE: 3
aaggggagtg gcgatatctc tgtgacagag cacttta                              37

SEQ ID NO: 4            moltype = DNA   length = 41
FEATURE                 Location/Qualifiers
source                  1..41
                        mol_type = other DNA
                        organism = synthetic construct
SEQUENCE: 4
aaaaagatct gctagctcga gtcaagggta caggccgtag t                         41
```

S2, taking the plasmid pCAGGS-E2 as a template, amplifying an E2 fragment using a forward primer (F): AAGGGGAGTGGCGA-TATCTCTGTGACAGAGCACTTTA as set forth in SEQ ID NO: 3 and a reverse primer (R): AAAAA-GATCTGCTAGCTCGAGTCAAGGGTA-CAGGCCGTAGT as set forth in SEQ ID NO: 4, performing double digestion on the amplified E2 antigen gene fragment and a pCAGGS-GLuc vector plasmid carrying GLuc genes with EcoRV and XhoI restriction enzymes, and ligating enzyme-digested products using a T4 DNA ligase to obtain a recombinant plasmid pCAGGS-GLuc-E2; and S3, culturing human embryonic kidney (HEK)-293T cells, transfecting the recombinant plasmid pCAGGS-Gluc-E2 into the cells using a liposomal nucleic acid transfection reagent if the cell density reaches 60-70%, further culturing the 293T cells after transfection, and collecting and centrifuging a cell supernatant after culture to obtain the GLuc-E2 fusion protein from the collected supernatant.

3. A luciferase immunoprecipitation kit for detecting porcine GETV, comprising the following components: sample diluent, blocking buffer, GLuc-E2 fusion protein as described in claim 1, protein A-coated microplate, wash buffer, luciferase substrate, positive control, and negative control.

4. The luciferase immunoprecipitation kit for detecting porcine GETV according to claim 3, wherein the sample diluent is phosphate-buffered saline (PBS) at pH=7.4; the wash buffer is PBS containing 0.05% non-ionic surfactant (PBST);

and the luciferase substrateis 20 μM of coelenterazine h.

5. The luciferase immunoprecipitation kit for detecting porcine GETV according to claim 3, wherein the blocking buffer comprises at least one of 1% of bovine serum albumin (BSA), 5% of skim milk, or 10% of skim milk; and the positive control is GETV standard positive serum, and the negative control is GETV standard negative serum.

6. The luciferase immunoprecipitation kit for detecting porcine GETV according to claim 3, wherein a preparation and preservation method for the protein A-coated microplate comprises the steps of: preparing the protein A into a protein A solution with a concentration of 20 μg/mL using the PBS, adding the protein A solution to the microplate at 100 μL/well, sealing the microplate with a film, discarding the protein A solution after incubating at 4° C. for 16 hours, washing the plate 5 times with PBST at 300 μL/well, and drying the microplate at 4° C. for preservation.

7. A construction method for the luciferase immunoprecipitation kit for detecting porcine GETV, comprising the steps of:

S1, preparing a GETV GLuc-E2 fusion protein fluid using the methods of claim 2;

S2, determining a blocking buffer, the blocking buffer comprising at least one of 1% of BSA, 5% of skim milk, or 10% of skim milk;

S3, blocking: setting a sealing temperature at 37° C. and a sealing time at 1 h;

S4, incubation: setting an incubation temperature at 37° C. and an incubation time at 1 h;

S5, fusion antigen addition: adding fusion antigen at a quantity of $10^7$ luminance units; and S6, diluting a serum sample to be tested, and GETV positive or negative control serum samples at a serum dilution ratio of 1:100.

* * * * *